United States Patent
Bartell

(10) Patent No.: US 8,881,767 B2
(45) Date of Patent: Nov. 11, 2014

(54) BALL VALVE AND SEAT ASSEMBLY WITH LIFE-SUSTAINING FLOW

(71) Applicant: Conbraco Industries, Inc., Pageland, SC (US)

(72) Inventor: Kevin Dwayne Bartell, Kershaw, SC (US)

(73) Assignee: Conbraco Industries, Inc., Pageland, SC (US)

( * ) Notice: Subject to any disclaimer, the term of this patent is extended or adjusted under 35 U.S.C. 154(b) by 160 days.

(21) Appl. No.: 13/775,733

(22) Filed: Feb. 25, 2013

(65) Prior Publication Data

US 2014/0238518 A1    Aug. 28, 2014

(51) Int. Cl.
  *F16K 5/06*    (2006.01)
  *F16K 5/10*    (2006.01)
  *F16K 11/087*    (2006.01)

(52) U.S. Cl.
  CPC .......... *F16K 11/0873* (2013.01); *F16K 5/0605* (2013.01); *F16K 5/10* (2013.01)
  USPC ..................................... 137/625.32; 251/117

(58) Field of Classification Search
  USPC ............ 137/625.28, 625.32, 625.47; 251/117
  See application file for complete search history.

(56) References Cited

U.S. PATENT DOCUMENTS

| | | | | | |
|---|---|---|---|---|---|
| 3,349,799 | A | * | 10/1967 | Mueller et al. | ........... 137/625.22 |
| 3,464,449 | A | * | 9/1969 | Morton | ..................... 137/625.24 |
| 3,557,832 | A | * | 1/1971 | Mueller et al. | ........... 137/625.22 |
| 3,604,455 | A | * | 9/1971 | Therneau | ....................... 137/583 |
| 4,130,128 | A | * | 12/1978 | Kaneko | ......................... 137/269 |
| 5,052,657 | A | * | 10/1991 | Winship | ........................ 251/160 |
| 5,181,539 | A | * | 1/1993 | Yokoyama | ............... 137/625.32 |
| 5,305,986 | A | * | 4/1994 | Hunt | ............................. 251/207 |
| 5,360,036 | A | * | 11/1994 | Kieper | ...................... 137/625.22 |
| 7,089,960 | B2 | * | 8/2006 | Maruta | ..................... 137/625.22 |
| 7,455,372 | B2 | * | 11/2008 | Wang et al. | ..................... 303/56 |
| 7,850,143 | B1 | * | 12/2010 | Rosada et al. | ................. 251/316 |
| 8,365,766 | B2 | * | 2/2013 | Wang | ......................... 137/556.6 |

* cited by examiner

*Primary Examiner* — John Fox
(74) *Attorney, Agent, or Firm* — Shumaker, Loop & Kendrick, LLP

(57) ABSTRACT

A ball valve including a valve body having a valve chamber, a ball member positioned in the valve chamber and defining first and second internal passages in fluid communication, and first and second seat rings, the first seat ring allowing fluid to flow past and through the second passage when the ball valve is in a life-sustaining flow operating position.

20 Claims, 5 Drawing Sheets

BALL VALVE AND SEAT ASSEMBLY WITH
LIFE-SUSTAINING FLOW

TECHNICAL FIELD AND BACKGROUND OF
THE INVENTION

1. Field of the Invention

The present invention relates generally to the field of ball valves, and more particularly, to a ball valve configured with flow, no flow and life-sustaining flow operating positions.

2. Background of the Invention

Ball valves are well known and generally include a valve body defining a valve chamber, a substantially spherical ball member rotatably positioned within the valve chamber, and annular seats for sealing engagement with the ball positioned adjacent inlet and outlet openings of the valve chamber. The ball member further defines an internal passage therethrough that is rotated in the direction of axial alignment with the valve body to open the valve to form a flow path from the valve inlet to the valve outlet, and rotated in the direction perpendicular to the valve body to close the valve to block the flow of fluid through the valve body. Rotation of the ball member may be achieved using a lever for selectively rotating the ball member between the open and closed positions.

The annular seats are axially constrained by sealing engagement with the surface of the valve member such that fluid is prevented from flowing between the ball member and internal walls of the valve chamber. The rate of flow through the internal passage is controlled by adjusting the degree of axial alignment of the internal passage with the flow path of the valve body.

While conventional ball valves exist configured to provide two operating positioned, i.e., flow and no flow operating positions, what is needed is a ball valve configured to provide a third operating position in which the valve can be closed yet maintain life-sustaining flow at all times.

BRIEF SUMMARY OF THE INVENTION

It is therefore an object of the present invention to provide a ball valve configured to provide flow, no flow and life-sustaining flow operating positions.

It is another object of the invention to provide a ball valve configured to allow fluid to "leak" past the upstream annular seat and through a secondary passage in the ball member when the valve is in a closed, life-sustaining flow operating position.

It is a further object of the invention to provide a ball valve in which a small percentage of the valves rated full flow capacity can be maintained when the valve is in a life-sustaining flow operating position.

It is a further object of the invention to a provide a ball valve for use on a water line to a residence or commercial building that allows the utility to close the valve yet maintain life-sustaining flow at all times.

To achieve the foregoing and other objects and advantages, in one embodiment a ball valve having a life-sustaining flow operating position is provided herein including a valve body defining a valve chamber and a flow path between a valve inlet and a valve outlet, a ball member rotatably positioned in the valve chamber and defining first and second internal passages in fluid communication, the first passage defined through the entire thickness of the ball member and the second passage extending between a sidewall of the first passage and a surface of the ball member, and first and second seat rings positioned axially in the valve chamber on opposite sides of the ball member, the first seat ring permitting fluid flow between the first seat ring and the ball member and the second seat ring for fluid-sealing engagement with the ball member. The ball member is selectively rotatable between a first operating position in which no fluid flow occurs through the flow path, a second operating position in which fluid flow occurs through the first passage, and a third operating position in which fluid flow occurs through the second passage.

In another aspect, the second passage is axially perpendicular to the first passage and has a length less than one-half the length of the first passage.

In a further aspect, the first seat ring defines a gap between a portion of the first seat ring and the ball member that allows fluid to leak therethrough.

In a further aspect, the first seat ring defines pairs of diametrically opposed gaps between the first seat ring and the ball member for fluid flow therethrough, the pairs of diametrically opposed gaps positioned between pairs of diametrically opposed fluid-sealing ball member engagement portions of the first seat ring.

In a further aspect, the first seat ring defines a plurality of gaps radially-arranged around a major face of the first seat ring and positioned between a plurality of radially-arranged fluid-sealing engagement portions engaging the ball member.

In a further aspect, the first seat ring includes a central opening and a radially inward-extending chamfer extending around a major face of the first seat ring.

In a further aspect, a maximum outer diameter of the second passage is substantially less than a maximum outer diameter of the first passage.

In a further aspect, the second passage has a fluid flow capacity of about 1% of a rated full flow capacity of the ball valve.

In a further aspect, the second passage is axially aligned with the valve body and opens in a direction of the valve inlet when the ball member is in the first operating position, is arranged axially perpendicular to the valve body when the ball member is in the second operating position, and is axially aligned with the valve body and opens in a direction of the valve outlet when the ball member is in the third operating position.

According to another embodiment of the invention, a ball valve is provided herein including a valve body having an internal valve chamber and defining a flow path therethrough, a ball member rotatably positioned in the valve chamber and defining first and second internal passages in fluid communication, and first and second seat rings positioned axially in the valve body and engaging opposite sides of the ball member, the first seat ring permitting fluid flow between the first seat ring and the ball member and the second seat ring for fluid-sealing engagement with the ball member, wherein the ball member is rotatable between a first operating position in which no fluid flow occurs through the valve body, a second operating position in which fluid flow occurs through the first passage but not the second passage, and a third operating position in which fluid flow occurs through the second passage.

According to a further embodiment of the invention, a ball valve including an operating position in which the ball valve is closed yet maintains life-sustaining fluid flow through the ball valve at all times is provided herein including a valve body defining a valve chamber, a ball member rotatably positioned in the valve chamber, the ball member having first and second internal passages in fluid communication, the first internal passage extending through the thickness of the ball member and the second internal passage arranged perpendicular to the first internal passage and extending from the first internal passage to the surface of the ball member, the second internal passage having a maximum outer diameter substantially less than a maximum out diameter of the first internal passage, and first and second seat rings positioned axially in the valve chamber on opposite sides of the ball member, the first seat ring permitting fluid flow between the first seat ring and the ball member and the second seat ring for fluid-sealing engagement with the ball member. In the operating position in which the ball valve is closed yet maintains life-sustaining fluid flow therethrough, the second passage is generally oriented in a direction of a valve outlet such that fluid flows past the first seat ring, into the first internal passage, and through the second internal passage.

Additional features, aspects and advantages of the invention will be set forth in the detailed description which follows, and in part will be readily apparent to those skilled in the art from that description or recognized by practicing the invention as described herein.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
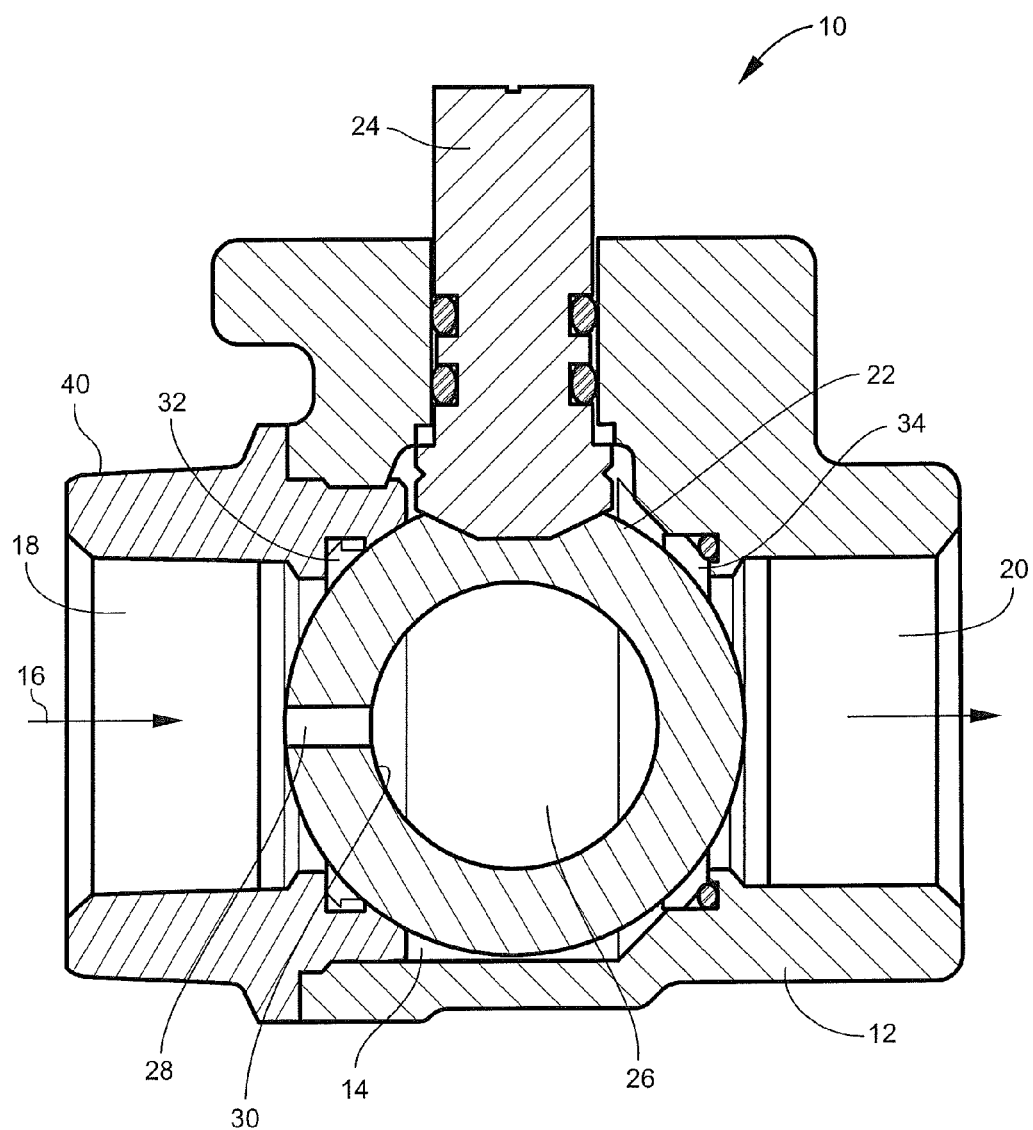
FIG. 1 is a cross-sectional view of an assembled ball valve according to the invention taken along a longitudinal axis of the flow path of the valve body.

FIG. 1 illustrates a ball valve 10 including a valve body 12 defining an internal valve chamber 14 and a flow path 16 therethrough along a longitudinal axis of the valve body 12. The flow path 16 has a circular cross-section in a plane perpendicular to the longitudinal axis of the valve body near the inlet 18 and outlet 20 ends of the valve body. A ball member 22 is rotatably positioned in the valve chamber 14 and accessed through the retainer 40, thereby forming an "end-entry valve." The ball member 22 is rotated relative to the valve body 12 using a lever 24 to rotate the ball between different operating positions to control the flow of fluid through the valve 10.

The ball member 22 is a substantially spherical ball having first and second internal fluid flow passages. The first internal passage 26 extends linearly through the entire thickness of the ball member 22 and has an outer diameter substantially equal to that of the flow path of the valve body 12 and retainer 40. The second internal passage 28 is in fluid communication with the first internal passage 26 and extends linearly from a sidewall 30 of the first internal passage to one side of the ball member 22. As can be seen, the first and second internal passages 26, 28 are axially perpendicular, thus only one of the first and second internal passages can be axially aligned along the longitudinal axis of the valve body 12 at a time. Because the first and second internal passages 26, 28 are in fluid communication, fluid is able to flow into the first internal passage 26 and out through the second internal passage 28 when the ball member 22 is rotated to a life-sustaining flow operating position.

The second internal passage 28 is a short linear passage that opens through only one side of the ball member 22, and thus has a length substantially less than that of the first internal passage, and less than one-half the diameter of the ball member. The second internal passage 28 has a maximum outer diameter substantially less than that of the first internal passage 26 such that fluid flow capacity through the second internal passage 28 is substantially less than that through the first internal passage 26. In a preferred embodiment, the outer diameter of the second internal passage 28 is sized such that fluid flow capacity therethrough is about 0.1% to 5% of the rated full flow capacity of the valve 10, more preferably about 1% of the rated full flow capacity of the valve. Full flow capacity is the rate of flow through the valve 10 when the valve is fully open with first internal passage 26 is axially aligned along the longitudinal axis of the valve body 12 and retainer 40.

First and second seat rings 32, 34 are positioned axially in the valve chamber 14 on opposite sides of the ball member 22. As used herein, the first seat ring 32 is also referred to as the "upstream seat ring" or "inlet seat ring", and the second seat ring 34 is also referred to as the "downstream seat ring" or "outlet seat ring." In a conventional ball valve, both the inlet and outlet seat rings are compressed during assembly for fluid-sealing engagement with the ball member such that fluid can only pass through the ball member when the valve is open and not around the ball member. In the present invention, the second seat ring 34 provides fluid-sealing engagement with the surface of the ball member 22 like in a conventional ball valve, however, the inventive first seat ring 32 permits fluid to flow or "leak" past the first seat ring and around the ball member on a path ultimately through the second internal passage 28 when the ball member 22 is in a life-sustaining flow operating position.

Figure 2:
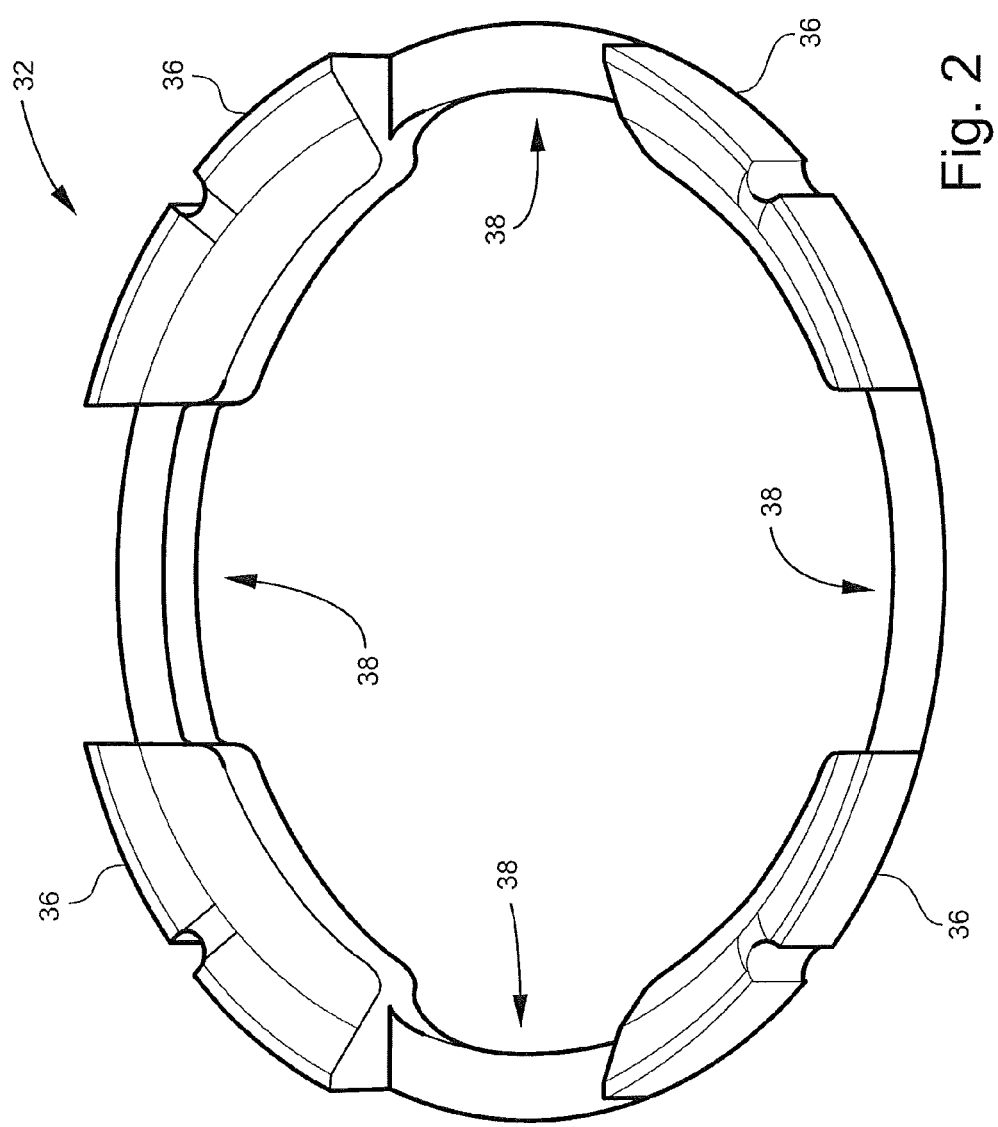
FIG. 2 is an isolated perspective view of the inlet seat ring according to the invention showing the ball member engagement side having circumferential gaps.

Referring to FIGS. 1 and 2, the first seat ring 32 is an annular ring generally including an opening therethrough and opposing major faces. One major face is substantially flush and is compressed into engagement against the valve body 12. The other of the major faces includes alternating engagement portions 36 and gaps 38, e.g., high and low spots, for respective engagement with the ball member 22. The first and second seat rings 32, 34 can be formed, in whole or in part, from various materials including, but not limited to, elastomeric materials, flexible materials, soft metals and coated metals.

The ball member engaging portions 36 of the first seat ring 32 are angled radially inward to better engage the surface of the ball member 22. The gaps 38 are formed by breaks and material reduction between the spaced apart engaging portions 36. The spaces provided by the gaps, while allowing fluid to flow therethrough, provide a substantially lesser flow capacity therethrough as compared to the flow capacity through the first internal passage 26, thus providing "leaking" as opposed to full flow. As shown, the first seat ring 32 can include elongate gaps 38 centered at each of the 12 o'clock, 3 o'clock, 6 o'clock and 9 o'clock positions. Alternative gap shapes, lengths and number of gaps are envisioned.

The second internal passage 28 and the gaps 38 provided by the first seat ring 32 provide a valve with three operating positions, i.e., "no flow", "flow" and "life-sustaining flow" operating positions, in comparison to a conventional ball valve including only two operating positions, i.e., "no flow" and "flow". As used herein, the term "no flow" refers to the operating position in which the valve is closed and fluid flow through the valve is blocked, the term "flow" refers to the operating position in which the valve is open and fluid flows through the valve through the first internal passage 26, and the term "life-sustaining flow" refers to the operating position in which the valve is closed yet life-sustaining fluid flow occurs through the valve through the second internal passage 28.

Figure 3:
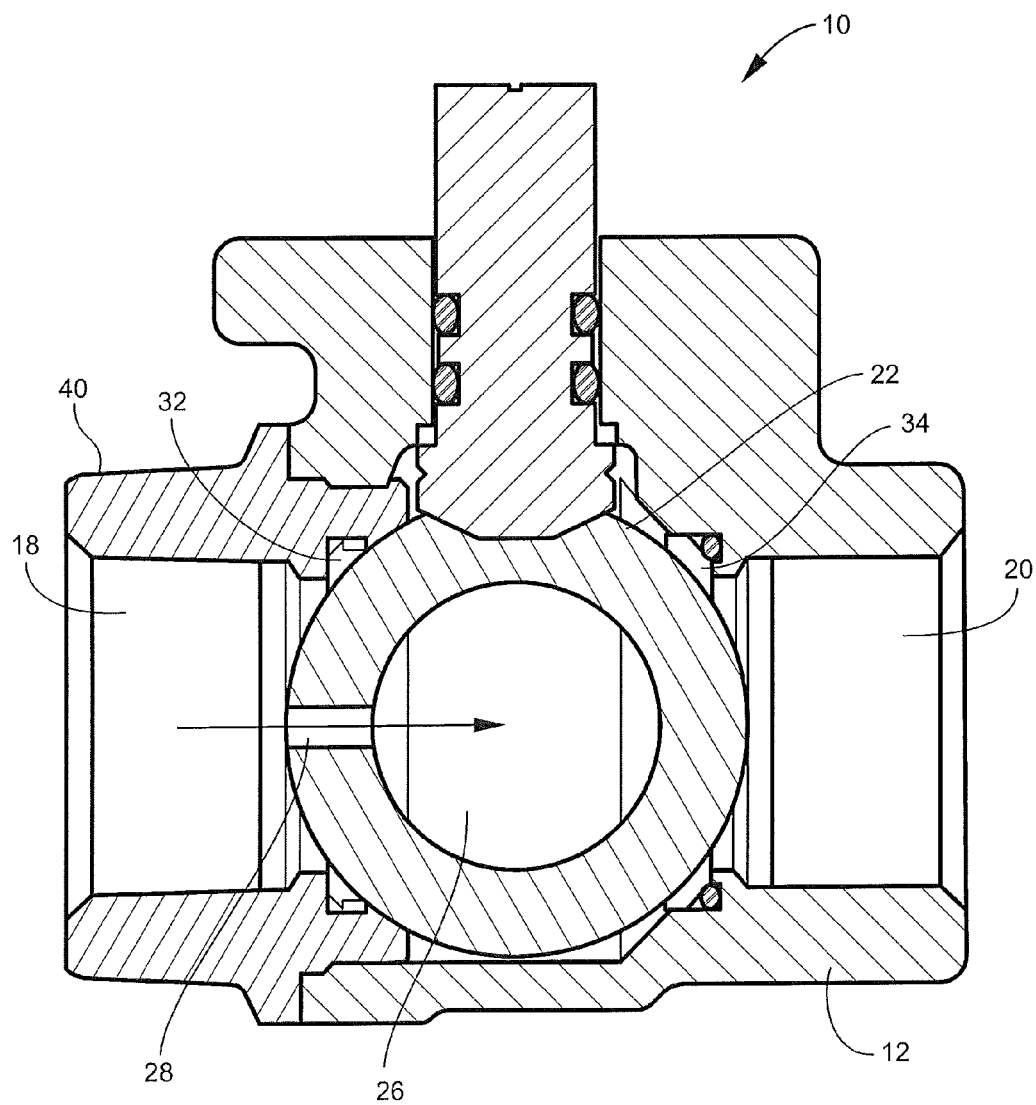
FIG. 3 is a cross-sectional view of the assembled ball valve showing the ball member in a no flow operating position.

Referring to FIG. 3, the no flow operating position is shown in which the valve is closed and the ball member 22 is rotated to the position such that the first internal passage 26 is aligned perpendicular to the longitudinal axis of the valve body 12, and the second internal passage 28 is axially aligned with the valve body but facing the inlet 18. In this operating position, fluid is blocked from flowing past the ball member 22 and second seat ring 34.

Figure 4:
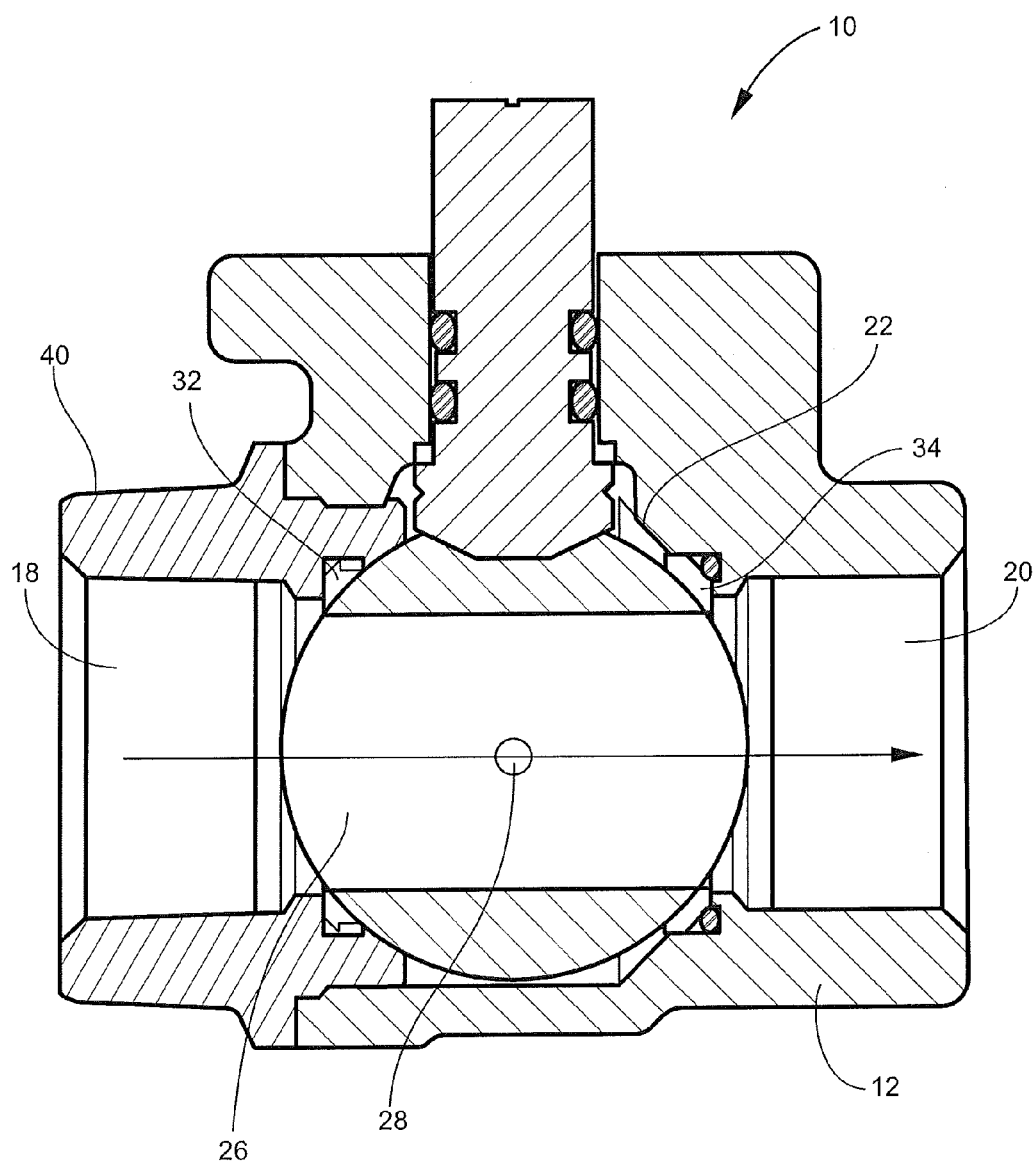
FIG. 4 is a cross-sectional view of the assembled ball valve showing the ball member in a flow operating position.

Referring to FIG. 4, the flow operating position is shown in which the valve is open and the ball member 22 is rotated to the position such that first internal passage 26 is axially aligned along the longitudinal axis of the valve body 12 and retainer 40. The second internal passage is perpendicular to the longitudinal axis of the valve body. In this operating position, fluid flows through the valve 10 through the first internal passage 26, the rate at which is controlled by adjusting the degree of alignment of the first internal passage 26 along the longitudinal axis of the valve body 12 and retainer 40.

Figure 5:
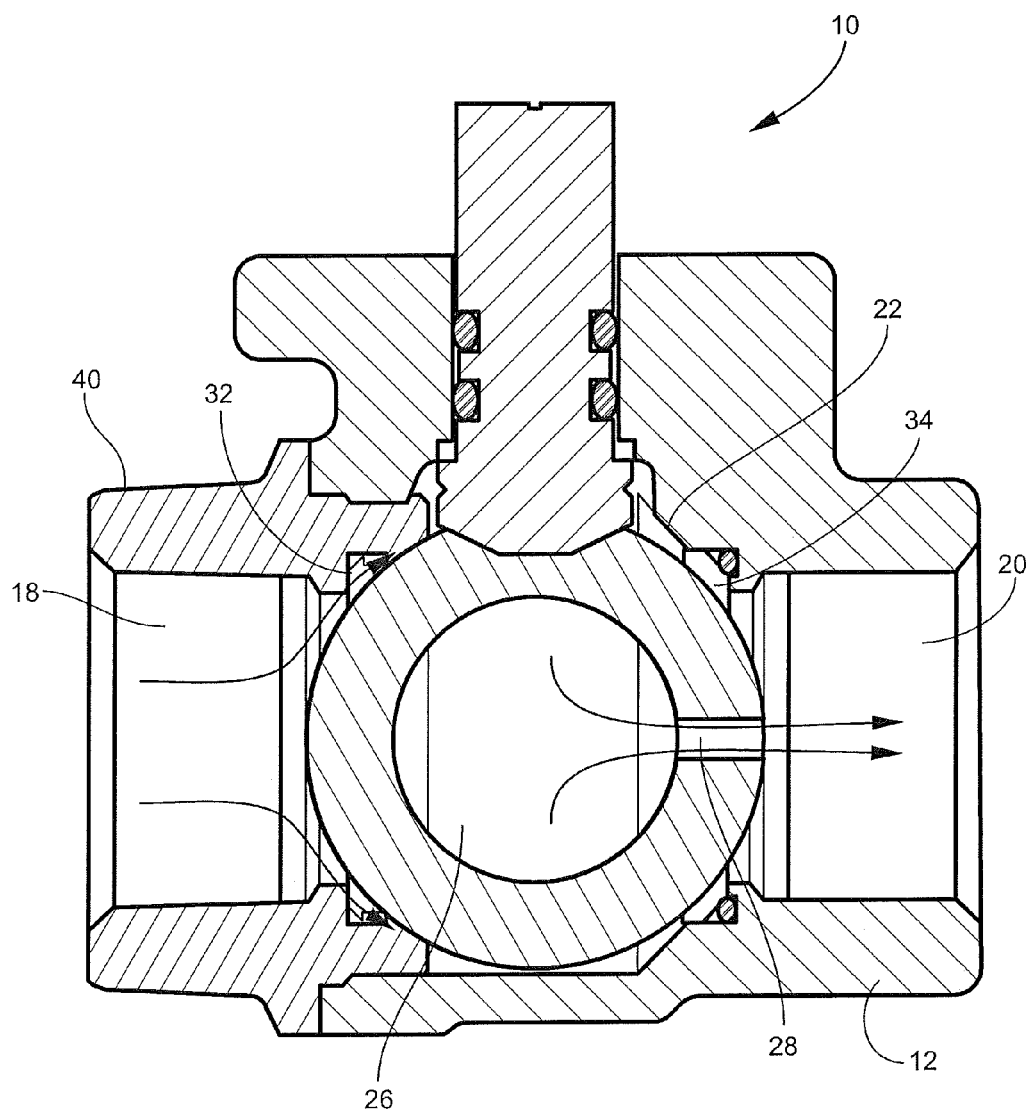
FIG. 5 is a cross-sectional view of the assembled ball valve showing the ball member in a life-sustaining flow operating position.

Referring to FIG. 5, the life-sustaining flow operating position is shown in which the valve is effectively closed and the ball member 22 is rotated to the position such that the first internal passage 26 is axially perpendicular to the longitudinal axis of the valve body 12 and retainer 40. The second internal passage 28 is axially aligned along the longitudinal axis of the valve body 12 and facing in the direction of the valve outlet 20. In this inventive operating position, fluid entering the valve through the inlet 18 is able to pass by or "leak" past the first seat ring 32 through the spaces provided by the gaps 38, flood the valve chamber 14 and the first internal passage 26, and flow out through the second internal passage 28 and ultimately out through the valve outlet 20. This inventive operating position allows a utility to effectively close the valve 10 yet maintain life-sustaining flow at all times.

The three operating positions of the valve 10 can be achieved by rotating the ball member 22 through about a 180-degree range of rotation. For example, the no flow operating position may require turning the lever 24 perpendicular to the longitudinal axis of the valve body 12, the flow operating position may require turning the lever into alignment along the longitudinal axis of the valve body 12 and pointing downstream, and the life-sustaining flow operating position may require turning the lever into alignment along the longitudinal axis of the valve body 12 but pointing upstream. Indicia may be provided on one or more the valve body 12 and lever 24 for indicating the operating positions of the valve 10. Rotation of the ball member 22 may be automated or manual. Other lever positions for achieving the operating positions are envisioned.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A ball valve, comprising:
    a valve body defining a valve chamber and a flow path between a valve inlet and a valve outlet;
    a ball member positioned in the valve chamber and defining first and second internal passages in fluid communication, the first passage defined through the thickness of the ball member and the second passage extending between a sidewall of the first passage and a surface of the ball member; and
    first and second seat rings positioned axially in the valve chamber on opposite sides of the ball member, the first seat ring permitting fluid flow between the first seat ring and the ball member and the second seat ring for fluid-sealing engagement with the ball member;
    wherein the ball member is selectively rotatable between a first operating position in which no fluid flow occurs through the flow path, a second operating position in which fluid flow occurs through the first passage, and a third operating position in which fluid flow occurs through the second passage.

2. The ball valve of claim 1, wherein the second passage is axially perpendicular to the first passage and has a length less than one-half a length of the first passage.

3. The ball valve of claim 1, wherein the first seat ring defines a gap between a portion of the first seat ring and the ball member that allows fluid to leak therethrough.

4. The ball valve of claim 1, wherein the first seat ring defines pairs of diametrically opposed gaps between the first seat ring and the ball member for fluid flow therethrough, the pairs of diametrically opposed gaps positioned between pairs of diametrically opposed fluid-sealing ball member engagement portions of the first seat ring.

5. The ball valve of claim 1, wherein the first seat ring defines a plurality of gaps radially-arranged around a major face of the first seat ring and positioned between a plurality of radially-arranged fluid-sealing engagement portions engaging the ball member.

6. The ball valve of claim 1, wherein the first seat ring comprises a central opening and a radially inward-extending chamfer extending around a major face of the first seat ring.

7. The ball valve of claim 1, wherein a maximum outer diameter of the second passage is substantially less than a maximum outer diameter of the first passage.

8. The ball valve of claim 1, wherein the second passage has a fluid flow capacity of 0.1% to 5% of a rated full flow capacity of the ball valve.

9. The ball valve of claim 1, wherein the second passage is axially aligned with the valve body and opens in a direction of the valve inlet when the ball member is in the first operating position, is arranged axially perpendicular to the valve body when the ball member is in the second operating position, and is axially aligned with the valve body and opens in a direction of the valve outlet when the ball member is in the third operating position.

10. A ball valve, comprising:
    a valve body having an internal valve chamber and defining a flow path therethrough;
    a ball member rotatably positioned in the valve chamber and defining first and second internal passages in fluid communication; and
    first and second seat rings positioned axially in the valve body and engaging opposite sides of the ball member, the first seat ring permitting fluid flow between the first seat ring and the ball member and the second seat ring for fluid-sealing engagement with the ball member;

wherein the ball member is rotatable between a first operating position in which no fluid flow occurs through the valve body, a second operating position in which fluid flow occurs through the first passage but not the second passage, and a third operating position in which fluid flow occurs through the second passage.

11. The ball valve of claim 10, wherein the first seat ring defines a gap between the first seat ring and the ball member for fluid flow therethrough, the gap positioned between fluid-sealing ball member engagement portions of the first seat ring.

12. The ball valve of claim 10, wherein the first seat ring defines pairs of diametrically opposed gaps between the first seat ring and the ball member for fluid flow therethrough, the pairs of diametrically opposed gaps positioned between pairs of diametrically opposed fluid-sealing ball member engagement portions of the first seat ring.

13. The ball valve of claim 10, wherein the first seat ring defines a plurality of gaps radially-arranged around a major face of the first seat ring and positioned between a plurality of radially-arranged fluid-sealing engagement portions engaging the ball member.

14. The ball valve of claim 10, wherein the first seat ring comprises a central opening and a radially inward-extending chamfer extending around a major face.

15. The ball valve of claim 10, wherein a maximum outer diameter of the second passage is substantially less than a maximum outer diameter of the first passage.

16. The ball valve of claim 10, wherein the second passage has a fluid flow capacity of 0.1% to 5% of a rated full flow capacity of the ball valve.

17. The ball valve of claim 10, wherein the second passage is axially aligned with the valve body and opens in a direction of a valve inlet when the ball member is in the first operating position, is arranged axially perpendicular to the valve body when the ball member is in the second operating position, and is axially aligned with the valve body and opens in a direction of a valve outlet when the ball member is in the third operating position.

18. A ball valve including an operating position in which the ball valve is closed yet maintains life-sustaining fluid flow through the ball valve at all times, the ball valve comprising:

a valve body defining a valve chamber;

a ball member rotatably positioned in the valve chamber, the ball member having first and second internal passages in fluid communication, the first internal passage extending through the thickness of the ball member and the second internal passage arranged perpendicular to the first internal passage and extending from the first internal passage to the surface of the ball member, the second internal passage having a maximum outer diameter substantially less than a maximum out diameter of the first internal passage; and first and second seat rings positioned axially in the valve chamber on opposite sides of the ball member, the first seat ring permitting fluid flow between the first seat ring and the ball member and the second seat ring for fluid-sealing engagement with the ball member;

wherein when the ball member is in the operating position in which the ball valve is closed yet maintains life-sustaining fluid flow therethrough, the second passage is generally oriented in a direction of a valve outlet such that fluid flows past the first seat ring, into the first internal passage, and through the second internal passage.

19. The ball valve of claim 18, wherein the first seat ring defines a gap between the first seat ring and the ball member for fluid flow therethrough, the gap positioned between fluid-sealing ball member engagement portions of the first seat ring.

20. The ball valve of claim 18, wherein the second passage has a fluid flow capacity of 0.1% to 5% of a rated full flow capacity of the ball valve.

\* \* \* \* \*